Jan. 24, 1939.  H. P. EASTMAN  2,145,221
RESERVOIR FOOT PUMP DUSTER
Filed Nov. 4, 1937  2 Sheets-Sheet 2

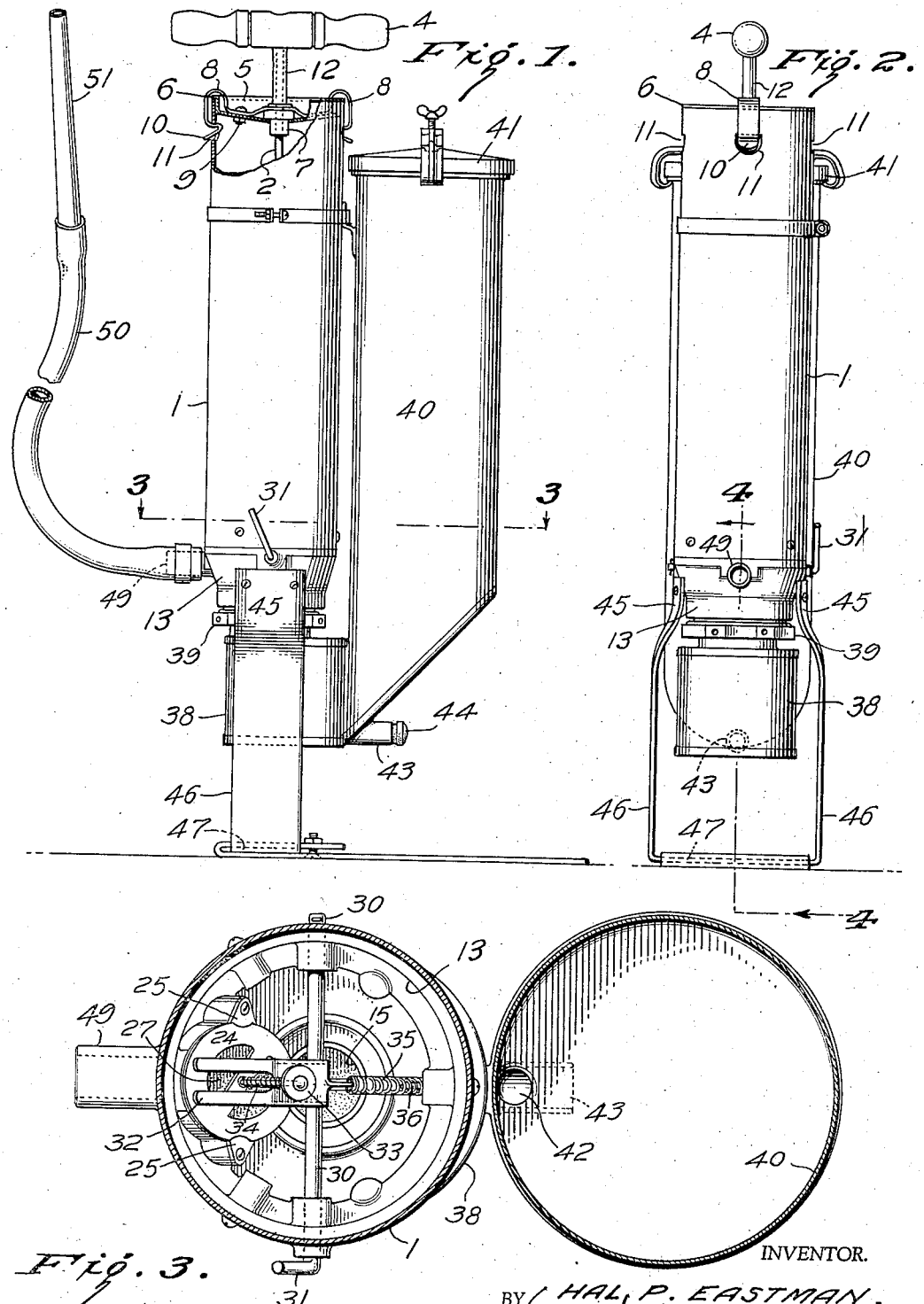

INVENTOR.
HAL P. EASTMAN,
BY Ellis S. Middleton
ATTORNEY.

Patented Jan. 24, 1939

2,145,221

UNITED STATES PATENT OFFICE 2,145,221

RESERVOIR FOOT PUMP DUSTER

Hal P. Eastman, Monrovia, Calif., assignor to American Cyanamid & Chemical Corporation, New York, N. Y., a corporation of Delaware Application November 4, 1937, Serial No. 172,732

3 Claims. (Cl. 43—147)

The present invention relates to a pump duster, that is, to a device for ejecting or dusting powdered material by means of impelled air.

While the invention is primarily adapted for the distribution of a dusting material in the form of a fumigant, yet obviously the invention is not to be limited thereto as any desired powdered or dust material may be conveniently distributed by the device of this invention.

In devices of the above type, it has been found in actual practice that where air was impelled directly into the dust supply and the mixture ejected therefrom it was difficult to secure a uniform pick-up or dosage of the dust inasmuch as with each succeeding dose, the total quantity of dust left in the supply tank was correspondingly diminished and, hence, the conditions surrounding the pick-up of dust by the air could not be maintained uniform. On the other hand, if the main supply of dust were remote from the mixing chamber, that is, where the dust was actually picked up and entrained by the air, the dust supply had a tendency to settle and cake with obvious difficulties. Attempts have been made to remedy this situation by providing mechanical stirrers in the dust supply but devices of this character are objectionable due to the fact that they require considerable power for operation, the attention of the operator must be periodically diverted to this part of the equipment and, moreover, mechanical agitation of the dust in the supply tank or chamber has the effect of beating air therefrom which actually increases its tendency to settle into a dense mass.

The principal object of the invention, therefore, is the provision of a dusting device in which the dust in the supply reservoir will be maintained constantly in a loose, non-caking condition, to thereby enhance its flow to the point of ejection, all automatically during the operation of the ejection mechanism.

Another important object of the invention is to provide a duster in which a stream of air is discharged into a receptacle containing a constant level and volume of the material to be dusted and the resulting mixture of dust and air blown through a discharge port to the point of application, where the actual receptacle or chamber containing the dust picked up by the air will be separate and apart from the main supply of dusting material.

To this end, the invention contemplates the provision of air-supplying means which may conveniently take the form of a pump, to the lower 55 part of the barrel of which is secured a fixture carrying the necessary valve mechanism for controlling the flow of air and also a readily detachable dust mixing chamber to which a uniform quantity of dust is supplied from an exterior reservoir. The passageway between the exterior reservoir and the mixing chamber according to the present invention, permits air agitation of the dust supply upon each downstroke of the pump and, consequently, prevents undue settling or caking of the dust in the supply reservoir. The fixture also carries an exit opening for air and entrained dust and by appropriate operation of respective valves, air may be ejected directly through the exit opening, bypassing the dust chamber.

This invention further consists in the novel construction, combination and arrangement of parts more fully described herein and shown in the accompanying drawings. In the drawings:—

Fig. 1 is a side elevation of a device embodying the invention;

Fig. 2 is a front view of the device of Fig. 1;

Fig. 3 is a sectional view along the line 3—3 of Fig. 1;

Figure 4:
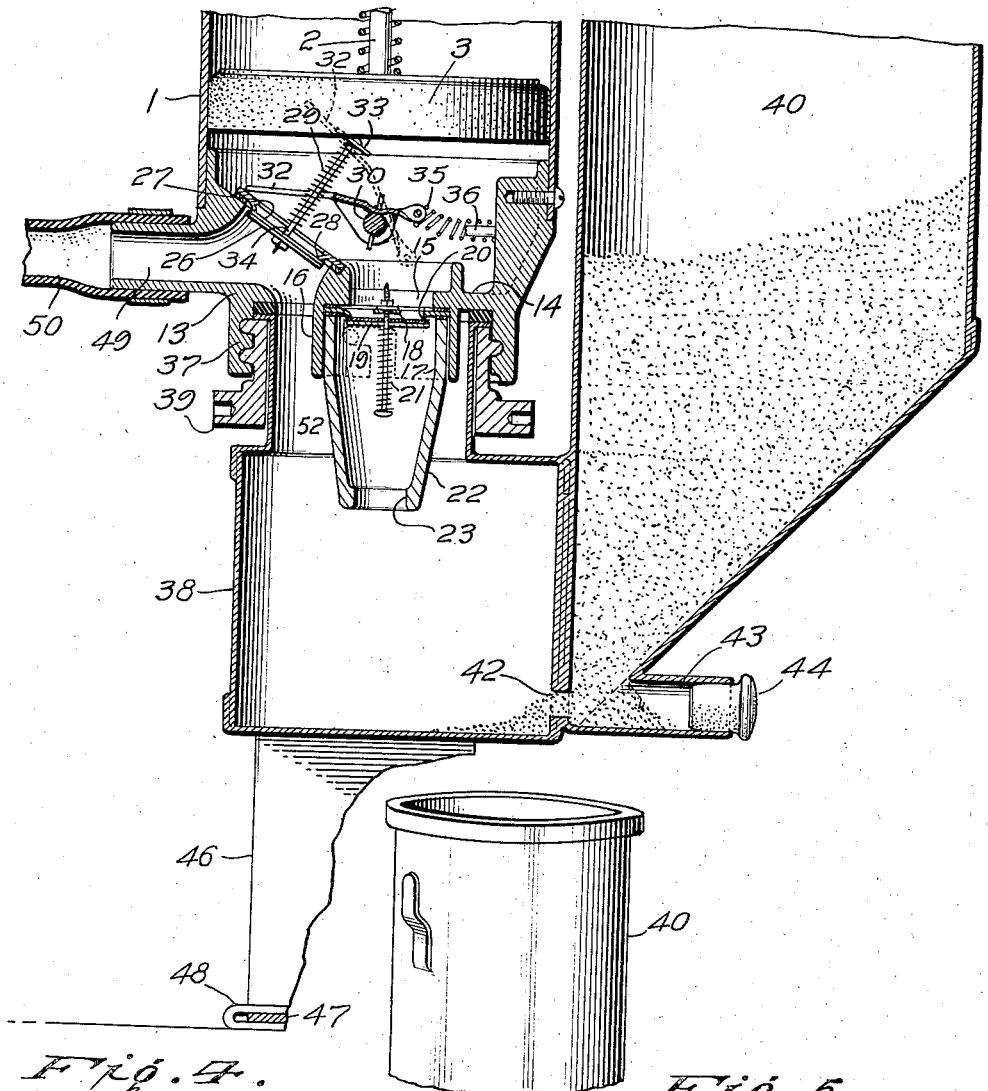
Fig. 4 is a fragmentary sectional elevation along the line 4—4 of Fig. 2.
Figure 5:
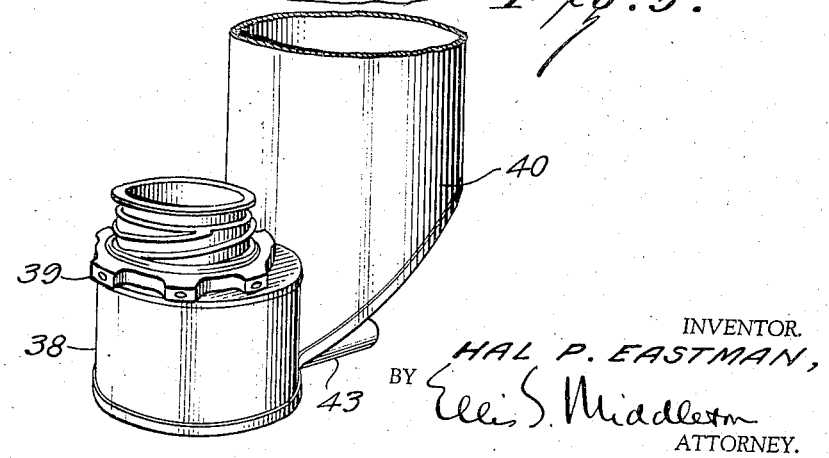
Fig. 5 is a perspective view of the mixing chamber and dust reservoir assembly.

Referring now to the embodiment illustrated, a pump barrel is shown at 1 to comprise a cylindrical element of the desired size within which operates the usual piston rod 2 carrying a plunger 3 thereon and having an operating handle 4. Within the top of the pump barrel 1 a dished cap 5 is provided having a peripheral flange 6 which seats on the top rim of the pump barrel. The rod 2 passes through an aperture in the cap 5 and a lubricated wooden bushing 7 located between the rod and the cap and held in place by a spring clip 8 secured to the cap as by bolts 9. The ends of the clip are bent over the top of the pump barrel and extend down the sides thereof to form spring fingers 10 which detachably engage apertures 11 in the pump barrel. A flanged sleeve 12 is provided surrounding the upper portion of the rod 2 and beneath the handle to prevent the plunger from moving too far down in the barrel. To the bottom of the pump barrel is secured a fixture 13 which conveniently takes the form of a casting and serves as a carrying agent for the valve and nozzle mechanism and also as the carrier for the dust mixing chamber and the dust reservoir.

The fixture 13 is provided with a centrally located wall 14 containing an aperture 15 therein through which air moves under the impulse of the plunger 3 in the normal course of dust ejection. On the bottom portion of the wall 14 there is formed a depending skirt 16 into which is detachably secured a nozzle 17 as by means of a bayonet joint connection. Between the top of the nozzle 17 and the bottom of the wall 14 is located a valve framework 18 having a valve proper 19 held upwardly against the seat 20 under pressure of the spring 21. Suitable gaskets are provided between the valve framework and the fixture as well as between the valve framework and the nozzle.

The nozzle 17 is provided with a tapered portion which terminates in a restricted tip 22 on the interior of which is located an inwardly projecting flange 23. The presence of this flange causes turbulence of air as it passes through the nozzle and insures the picking up of a maximum amount of dusting material.

The fixture 13 is also provided with a dust cut-off valve assembly comprising a framework 24 secured as by members 25 over aperture 26 with a valve 27 adapted to engage against seat 28 on the framework 24 under action of the spring 29. This spring is substantially weaker than the spring 21 located within the nozzle as above described.

A dust cut-off operating lever is shown at 30 passing completely through the fixture and journaled therein, terminating at one end in a handle 31 on the outside of the device. This lever carries a forked member 32 having restricted rotative movement therewith, which in the "off" or upper position (dotted lines) engages the stop 33 on the end of the spindle 34 which is attached to the valve 27. In this position, the valve cannot be opened under impulse of air from the pump but, on the contrary, is held against its seat. In the "on" or lower position, the forked member 32 rests against the framework 24 (in the full line position) and thus the valve 27 is free to operate. A spring 35 extends between the forked member 32 and a boss 36 on the fixture 13 serves to hold the forked member 32 and, consequently, the cut-off lever handle 31 in either the "off" or "on" position as the end of the forked member attached to the spring passes either to one side or the other of a center line between it and the boss 36.

To an outer depending skirt 37 on the fixture 13 there is detachably secured as by coarse threads, a mixing chamber 38 carrying a screw ring nut 39 used to attach the mixing chamber 38 to the threads on the skirt 37 of the fixture 13.

To the side of the mixing chamber 38 there is secured an upwardly extending cylindrical dust reservoir 40 having a top assembly 41 capable of tightly closing the same. An aperture 42 adjacent the bottom of the reservoir 40 and the mixing chamber 38 connects these two parts and permits the flow of dust from the supply reservoir to the mixing chamber and back passage of air from the mixing chamber 38 to the reservoir 40, thus providing for air agitation of the dust in the latter, which is an important part of the present invention. A clean-out aperture 43 is provided and this opening closed with a stopper 44.

Secured to the fixture 13 and to the outside thereof is a strap 45 having downwardly extending portions 46 which extend on each side of the dust mixing chamber 38 and beneath the same to form a foothold 47 to which may be secured an extension piece 48.

Above the mixing chamber 38, the fixture 13 is provided with an exit port 49 through which air alone or air and entrained dust may be ejected into a flexible hose 50 and distributing nozzle 51. As shown, the air nozzle 17 and its assembly is located eccentrically in the fixture 13 so as to provide an aperture 52 through which air and entrained dust may pass from the mixing chamber 38 to the exit port 49.

In operation, and assuming it is desired to deliver a mixture of dust and air rich in the former, the handle 31 is moved to the "off" position, the valve 27 thus being closed against operation. Air from the pump thus passes into the dust mixing chamber 38 by reason of the opening of valve 19, picks up the dust in the chamber and delivers it through ports 52 and 49 to the distributing hose 50. As the dust is picked up from the mixing chamber 38 and ejected from the device, additional dusting material is automatically fed downwardly from the reservoir 40 and through the feed aperture 42 into the mixing chamber. As a consequence, dust is maintained in the mixing chamber at a uniform level which makes for uniform dosage thereof through the distributing hose and nozzle. Moreover, the reservoir 40 being of comparatively large capacity, a considerable amount of dust may be stored therein without the necessity for refilling as would be the case were the mixing chamber relied upon solely as a dust supply.

At the same time, the downstroke of the pump causes a certain amount of air to back flow from the mixing chamber 38 through the aperture 42 and into the reservoir 40, thus causing agitation of the dust in the latter. The pressure from the air pump on each downstroke is adequately sufficient to back up through this port 42 and cause a bubble of air to raise into and through the dust mass keeping it agitated and saturated with air. When a mass of dust contains a large quantity of entrained air it will behave somewhat as a fluid. Consequently by this arrangement of parts which permits at each downstroke of the pump a portion of the impelled air to rise into and through the dust in the reservoir, not only is the dust kept in a fluid condition but when the stroke of the plunger is finished and the air pressure in the mixing chamber drops, the dust mass in the reservoir 40 settles back and at the same time actually ejects a small column of dust into the mixing chamber.

It is desirable, of course, to have a fairly tight cover on the reservoir 40, but the successful working of this reservoir and the air agitation is not dependent upon a tight cover, for even if there is some slight leakage of this back pressure of air on the pump downstroke, it serves the admirable purpose of keeping the dust completely agitated and in a free flowing condition. If a cover is used so tight as to allow the air which comes up through the dust mass to be compressed, there is a correspondingly quicker action in the delivery of the dust column into the mixing chamber caused by the expansion of the air in the reservoir as soon as the pressure in the mixing chamber 38 has dropped.

Upon moving the handle 31 to the "on" position, the valve 27 is free to operate. A normal downstroke on the handle 4 of the pump will, therefore, deliver air only through the aperture 26, the valve 27 opening in preference to valve 19 inasmuch as spring 29 is so much weaker than spring 21. Under these circumstances, valve 19 remains seated and as a consequence, air alone is ejected through the exit port 49, it having been by-passed around the dust mixing chamber 38. This action is desirable as where a rich dust mixture has been ejected from the hose 50, it can be followed by air alone to cause thorough distribution of the dust already ejected and clearance of the discharge hose 50 of any dust which may tend to remain therein.

Moving the pump handle downwardly faster and harder than normal, with the handle 31 in the "on" position will result in unseating both valves 19 and 27 with consequent ejection of relatively smaller quantities of dust due to the fact that a portion of the air is by-passed through the valve 27 without entrance into the dust mixing chamber.

It will be apparent, therefore, that with this device not only is a desirable control exercised over the concentration of dust to be entrained in the ejected air, but means have been provided whereby this concentration may be maintained uniformly on each stroke due to the fact that a constant level dust mixing chamber is provided, the supply of dust therefor flowing thereto under the action of gravity and/or the back pressure of air in the dust reservoir, which supply is constantly and automatically maintained in a loose free flowing condition.

While the invention has been shown and described with particular reference to specific embodiments, it is to be understood that it is not to be limited thereto but is to be construed broadly and restricted only by the scope of the claims.

I claim:

1. A duster device including a pump for supplying air, a dust mixing chamber receiving air from the pump, a dust reservoir supplying duct to the mixing camber and an exit opening for air and dust, said reservoir being provided with a feed opening adjacent the bottom of the mixing chamber, said feed opening extending outside of the reservoir and being closed by a plug to serve as a clean-out opening.

2. A duster device including a pump for supplying air, a dust reservoir, a mixing chamber receiving air from the pump and dust from the reservoir, an exit opening for air and entrained dust and means for providing air pressure on top of the dust in the reservoir whereby under the action of said pressure dust is forced from the reservoir into the mixing chamber.

3. A duster device including a pump for supplying air, a dust mixing chamber below the pump, a dust reservoir having a feed opening adjacent the bottom of the mixing chamber and adapted to maintain a desired level of dust in the chamber, means to impinge air from the pump upon the top of the dust in the mixing chamber, and an exit opening for dust and air above the mixing chamber.

HAL P. EASTMAN.

CERTIFICATE OF CORRECTION.

Patent No. 2,145,221.                                           January 24, 1939.

HAL P. EASTMAN.

It is hereby certified that error appears in the printed specification of the above numbered patent requiring correction as follows: Page 3, second column, line 6, claim 1, for the word "duct" read dust; line 7, for "camber" read chamber; and that the said Letters Patent should be read with this correction therein that the same may conform to the record of the case in the Patent Office.

Signed and sealed this 28th day of February, A.D. 1939.

Henry Van Arsdale.

(Seal)                                              Acting Commissioner of Patents.